US009520769B2

(12) United States Patent
Pasqua et al.

(10) Patent No.: US 9,520,769 B2
(45) Date of Patent: Dec. 13, 2016

(54) WAKE UP MANAGEMENT CIRCUIT FOR A SWITCHING CONVERTER AND RELATED WAKE UP METHOD

(71) Applicant: STMicroelectronics S.r.l., Agrate Brianza (IT)

(72) Inventors: Alfio Pasqua, Piedimonte Etneo (IT); Salvatore Tumminaro, Marianopoli (IT); Andrea Rapisarda, Motta S. Anastasia (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 43 days.

(21) Appl. No.: 14/644,452

(22) Filed: Mar. 11, 2015

(65) Prior Publication Data
US 2015/0318777 A1 Nov. 5, 2015

(30) Foreign Application Priority Data

Apr. 30, 2014 (IT) .............................. MI2014A0799

(51) Int. Cl.
*H02M 1/36* (2007.01)
*H02M 3/335* (2006.01)
*H02M 1/00* (2006.01)

(52) U.S. Cl.
CPC ........... *H02M 1/36* (2013.01); *H02M 3/33515* (2013.01); *H02M 3/33523* (2013.01); *H02M 2001/0035* (2013.01); *Y02B 70/16* (2013.01)

(58) Field of Classification Search
CPC .................... H02M 3/33507; H02M 3/33515; H02M 3/33523; H02M 1/36
See application file for complete search history.

(56) References Cited

U.S. PATENT DOCUMENTS

| 2009/0147546 A1* | 6/2009 | Grande ............. H02M 3/33523 363/21.16 |
|---|---|---|
| 2011/0019446 A1 | 1/2011 | Wu et al. |
| 2013/0003421 A1 | 1/2013 | Fang |
| 2013/0077350 A1 | 3/2013 | Mao |
| 2013/0077354 A1* | 3/2013 | Behagel ............ H02M 3/33523 363/21.01 |
| 2013/0100714 A1 | 4/2013 | Zhang et al. |
| 2013/0121040 A1 | 5/2013 | Lund et al. |

(Continued)

OTHER PUBLICATIONS

IT Search Report and Written Opinion for IT MI2014A000799 dated Feb. 19, 2015 (9 pages).

*Primary Examiner* — Jue Zhang
*Assistant Examiner* — Lakaisha Jackson
(74) *Attorney, Agent, or Firm* — Gardere Wynne Sewell, LLP

(57) ABSTRACT

A switching converter converts an input signal to a regulated output signal using a switch and a transformer with a primary winding and a secondary winding. A wake up management circuit receives a transformer demagnetization signal and forces by wake up pulses the switch on when the switching converter operates in a burst mode. Sampled values of the transformer demagnetization signal are received. A setting circuit sets a first peak value of the current of the primary winding. A comparison circuit compare the sampled values with a voltage threshold and the preceding sampled value. In response thereto, the first peak value of the primary winding current is either maintained or a new peak value is set.

18 Claims, 6 Drawing Sheets

(56) References Cited

U.S. PATENT DOCUMENTS

| | | | | |
|---|---|---|---|---|
| 2013/0223107 A1* | 8/2013 | Zhang | ............... | H02M 3/33523 363/21.16 |
| 2013/0250627 A1* | 9/2013 | Herfurth | ............. | H02M 3/3376 363/21.15 |
| 2014/0160809 A1* | 6/2014 | Lin | .................... | H02M 3/33523 363/21.16 |
| 2015/0229199 A1* | 8/2015 | Lu | ..................... | H02M 3/33507 363/21.12 |

* cited by examiner

WAKE UP MANAGEMENT CIRCUIT FOR A SWITCHING CONVERTER AND RELATED WAKE UP METHOD

PRIORITY CLAIM

This application claims priority from Italian Application for Patent No. MI2014A000799 filed Apr. 30, 2014, the disclosure of which is incorporated by reference.

TECHNICAL FIELD

The present disclosure relates to a wake up management circuit for a switching converter, particularly to a DC-DC switching converter, and a related wake up method.

BACKGROUND

The present disclosure relates to power switching converters providing a constant current to a load, for example a battery, with high efficiency. The present invention more particularly relates to a switched voltage and current regulator whose load should be isolated from the supply source of the regulator, frequently the 220-volt mains.

For example, a conventional power switching converter is the flyback converter wherein a transformer with a primary winding and a secondary winding is provided for isolating the load from the voltage source. The primary winding is connected to the voltage source through a power switch while the secondary winding is connected to a load by means of a diode and a filtering capacitor is connected in parallel to the load.

When the switch switches-on, a first current flows though the primary winding and increases from an initial value as a function of the values of the voltage source and of the inductance provided by the primary winding. During this time, no current flows through the secondary winding because the diode is reverse biased and the power is stored in the core of the transformer.

When the switch switches-off, the current flowing through the primary winding is abruptly switched-off and the power that was just stored in the core is transferred into the secondary winding. A second current on the secondary winding abruptly reaches a peak value equal to the peak current reached by the first current multiplied by the ratio between the number of turns of the primary winding and the secondary winding, when the switch is switched-off. The second current starts to decrease as a function of the inductance of the secondary winding and of the voltage across the load.

The amount of power transferred from the primary winding to the secondary winding depends upon the switching duty cycle of the switch. For this purpose, the power switching converter comprises a control circuit for driving the switch; the control circuit is configured to receive a feedback signal and operate the modification of the width of the control pulses of the switch in response to the feedback signal.

The feedback control is provided by means of an optocoupler or an auxiliary winding. In the last case, the auxiliary winding gives an image of the output voltage, being directly in phase with the secondary winding.

In conditions of light load the power switching converter is typically made operate in the so-called "burst-mode". With this operating mode the converter operates intermittently, with series (bursts) of switching cycles separated by time intervals during which the converter does not switch (idle time). When the load is such that the converter has just entered burst-mode operation, the idle time is short; as the load decreases, the duration of the bursts decreases as well and the idle time increases. In this way, the average switching frequency is considerably reduced and, consequently, the switching losses associated to the parasitic elements in the converter and the conduction losses related to the flow of reactive current in the transformer are reduced. The duration of the bursts and the idle time are determined by the feedback loop so that the output voltage of the converter always remains under control.

In the case wherein the feedback of the output voltage is formed by means of an auxiliary winding, the auxiliary winding also provides the supply voltage to the control circuit by means of a capacitor which sets a supply voltage, said capacitor being coupled with the auxiliary winding through a diode.

The minimum frequency of the burst-mode operation is determined by the control circuit of the switch; during the burst-mode operation, the control circuit periodically forces the switching-on of the switch with a certain "restart" frequency in order to receive the feedback signal. Thus, the power switching converter provides a fixed power which is independent from the load and this power needs to be dissipated to avoid that in case of low or zero load the converter goes out of regulation. To this purpose, a dummy load is typically used.

The power to dissipate mainly depends on the "restart" frequency, which cannot be chosen too low. In fact, during the time period between two subsequent commutations of the switch, the control circuit is not able to respond to an eventual variation of the load at the output terminal. Only when a commutation of the switch occurs the converter responds by providing to the load the required power. To overcome this problem, a known solution is to use a so-called wake up circuit configured to force a switching-on of the switch when the output voltage value is low during burst-mode.

The wake up circuit must interpret different load scenery and consequently to provide to the load the right power, maintaining good control performance and avoiding drawbacks like acoustic noise caused by a non-controlled voltage supply when the switching converter operates in burst mode with frequencies close to the audible range.

In particular, when the switching converter operates in burst mode the output voltage value at which the wake up circuit occurs is lower than the regulated output voltage value of a certain percentage. In this way the control circuit could provide the maximum power to the load to bring rapidly the output voltage at the regulated value. This raises two problems: acoustic noise due to the excessive current on the transformer; and a non-controlled ripple of the output voltage due to a delay of response of the wake up and control circuits.

In the case wherein the feedback signal derives from an auxiliary winding and the auxiliary winding also provides the supply voltage to the control circuit by means of a capacitor which sets a supply voltage, for very low loads and in the cases in which the average consumption of supply voltage is greater than the average consumption of output voltage, the restart frequency is very low and, due to a prolonged switching inactivity, the capacitor which defines the supply voltage of the control circuit could be excessively discharged. Sometimes is possible that the capacitor could have a value in which the supply voltage is very close to the Undervoltage-lockout (UVLO) threshold of the converter. In these conditions, the feedback voltage depends on both the output signal and the supply voltage, case in which the sampled feedback voltage is even lower than said percentage. This causes a prolonged high power phase and a higher ripple of the output voltage.

SUMMARY

One aspect of the present disclosure is to provide a wake up management circuit for a switching converter which is able to correctly restore the information on the feedback voltage related to the output voltage and interpret the conditions of the load connectable to the output terminal of the switching converter so to provide to the load the indispensable power to ensure a good performance.

One aspect of the present disclosure is a wake up management circuit of a switching converter, said switching converter being configured to convert an input signal to a regulated output signal by means of at least one switch and comprising a transformer with a primary winding coupled with the input terminal and a secondary winding coupled with the output terminal, said wake up management circuit being configured to receive a signal representative of the demagnetization of the transformer and being adapted to force by wake up pulses the switching on of the switch of the switching converter when the switching converter operates in a burst mode, wherein the wake up management circuit is configured to receive cycle by cycle sampled voltage values of the signal representative of the demagnetization of the transformer and comprises: a setting circuit configured to set a first peak value of the current of the primary winding, and a comparison circuit configured to compare cycle by cycle the sampled voltage value with at least one voltage threshold and the sampled voltage value with the preceding sampled voltage value and, as a response, maintain the first peak value of the current of the primary winding or set a new peak value of the current of the primary winding of the transformer.

BRIEF DESCRIPTION OF THE DRAWINGS

For a better understanding of the present invention, a preferred embodiment thereof is now described, purely by way of non-limiting example and with reference to the annexed drawings, wherein.

DETAILED DESCRIPTION OF THE DRAWINGS

Figure 1:
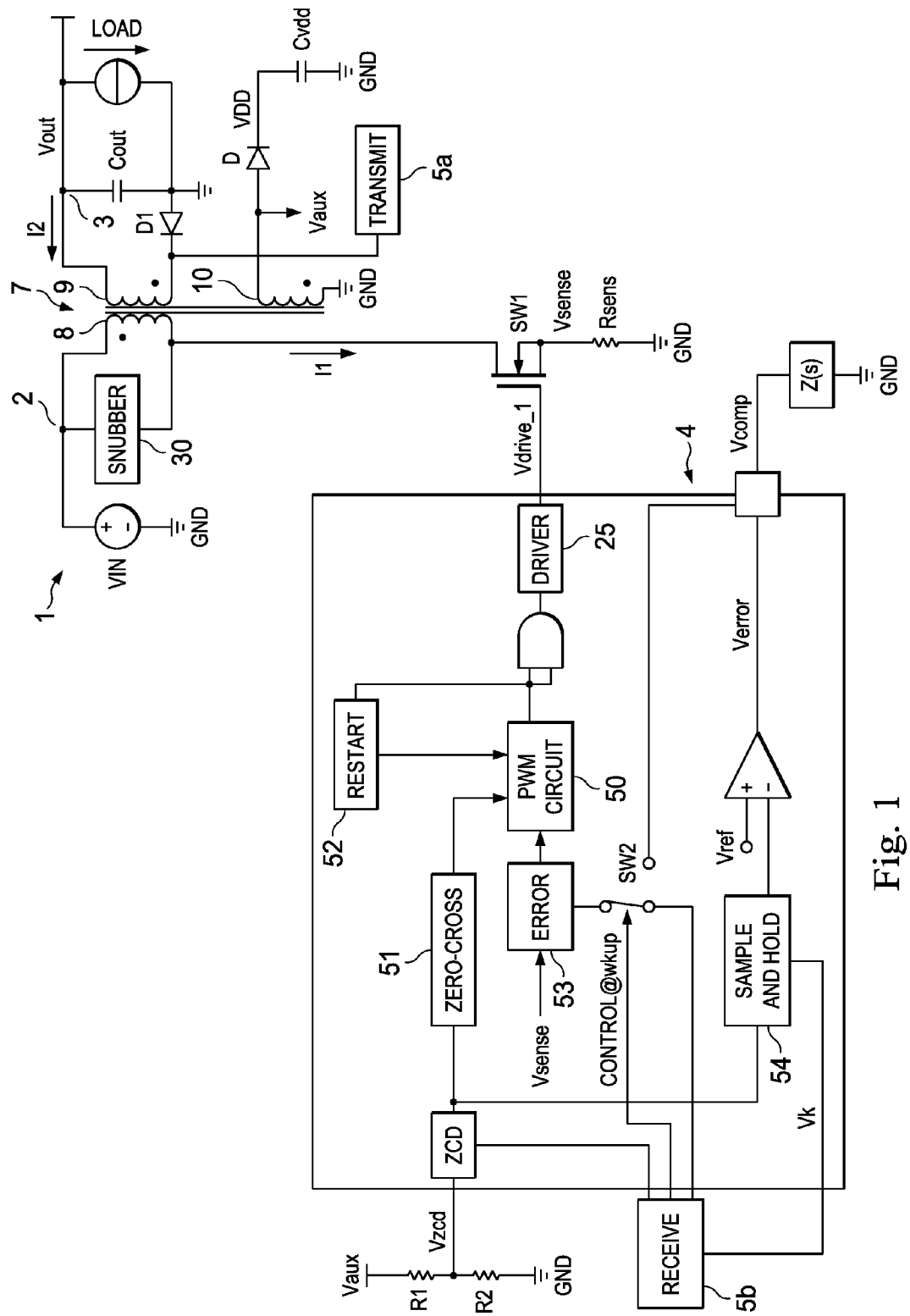
FIG. 1 is a block diagram of the wake up management circuit for a switching converter according to the present disclosure.

FIG. 1 illustrates a wake up management circuit 5 for a switching converter 1, preferably a DC-DC switching converter, according to the present disclosure. The switching converter 1 comprises an input terminal 2 configured to receive an input signal Vin, and an output terminal 3 configured to provide a regulated output signal Vout for supplying a load LOAD. For example, the input signal Vin is a rectified mains voltage (220V).

The power converter 1 then comprises a switch SW1 coupled to the input terminal 2, and a control circuit 4 configured to drive said switch SW1 for regulating the input signal Vin and providing at the output terminal 3 the regulated output signal Iout, Vout. More particularly, the switch SW1 is a power Mosfet with its drain terminal coupled with the input terminal 2, its source terminal connected with a sense resistor Rsens, and its gate terminal connected with the control circuit 4.

For example, the power converter 1 is a so-called flyback converter comprising a transformer 7 with a primary winding 8 coupled with the input terminal 2, a secondary winding 9 coupled with the output terminal 3 and an auxiliary winding 10 coupled with the control circuit 4. In particular, the primary winding 8 is arranged between the input terminal 2 and the drain terminal of the power Mosfet SW1, and the secondary winding 9 is arranged between the output terminal 3 and the cathode of a rectification diode D1 with its anode connected to a ground reference GND. Preferably a snubber circuit 30 is arranged in parallel with the primary winding 8.

An output capacitor Cout is also connected in parallel to the load LOAD.

The auxiliary winding 10 provides the supply voltage to the control circuit 4 by means of a capacitor Cvdd which sets a voltage VDD, said capacitor Cvdd being coupled with the auxiliary winding 10 through a diode D. The auxiliary winding 10 is directly in phase with the secondary winding 9, giving an image of the output signal Vout. The voltage across the auxiliary winding 10 is thus proportional to the voltage across the secondary winding 9.

The control circuit 4 is configured to provide a control signal Vdrive_1 to drive the switch SW1 by processing a feedback voltage Vaux, which is the voltage across the auxiliary winding 10.

The control circuit 4 comprises at least a pulse width modulation (PWM) circuit 50 configured to generate, through a driver 25 directly connected to switch SW1, the control signal Vdrive_1. The control signal Vdrive_1 is based on the value of an error voltage Verror computed through a comparison between the sampled feedback voltage Vaux (by means of a sample and hold block 54) and a predetermined voltage Vref. A voltage Vcomp, which is the error voltage Verror across an impedance Z(s), is sent to the PWM circuit 50 by means of a circuit block 53 which receives also the voltage Vsense across the resistance Rsens. Furthermore, the circuit 50 receives a restart signal from a circuit block 52 and a signal representative of the zero cross of the voltage Vaux from a further circuit block 51.

In operation, when the control circuit 4 switches-on the switch SW1, a first current I1 flows through the primary winding 8 and increases from an initial value as a function of the values of the input signal Vin and of the inductance provided by the primary winding 8. During this time, no current flows through the secondary winding 9 because the diode D1 is reverse biased and the power is stored in the core of the transformer 7.

When the control circuit 4 switches-off the switch SW1, the current of the primary winding 8 is abruptly switched-off and the power that was just stored in the core is transferred into the secondary winding 9. A second current I2 of the secondary winding 9 abruptly reaches a peak value equal to the peak current reached by the first current I1 multiplied by the ratio between the number of turns of the primary winding 8 and the secondary winding 9, when the switch SW1 is switched-off. The second current I2 starts to decrease as a function of the inductance of the secondary winding 9 and of the voltage across the load LOAD.

At the presence of light or zero load LOAD, the switching converter 1 operates in burst-mode. The switching converter 1 comprises a wake up management circuit 5 configured to force the switching-on of the switch SW1, when the switching converter operates in a burst mode, every time the output signal Vout falls below a prefixed threshold value Ref.

Preferably, the wake up management circuit 5 comprises a transmitting section 5a, coupled to the output terminal 3, and a receiving section 5b, coupled to the auxiliary winding 10 and the control circuit 4. The transmitting section 5a is configured to provide a wake up signal to the receiving section 5b when the output signal Vout falls below a prefixed threshold value Ref. On the other hand, the receiving section 5b is configured to detect the wake up signal from the transmitting section 5b, by monitoring the feedback voltage Vaux across the auxiliary winding 10, and, as a response, to provide a wake up control CONTROL@wkup to a further switch SW2 suited to alternately select the circuit block from which the driving signal is received, which is the control circuit 4 and, when a wake up occurs, the wake up management circuit 5. For example, the further switch SW2 could be implemented by means of a multiplexer with two inputs and one output coupled to the circuit block 53.

Figure 2:
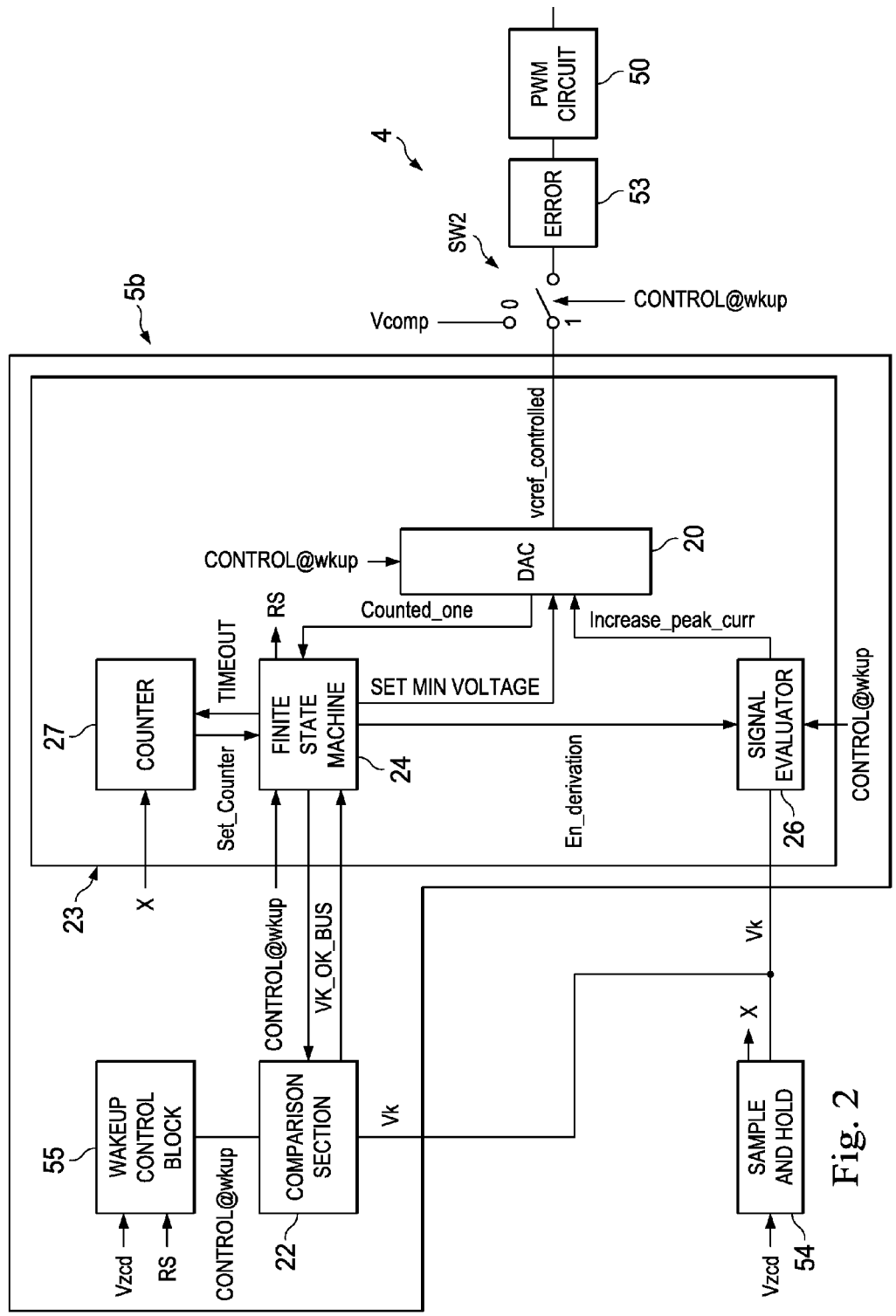
FIG. 2 is a block diagram of a wake up management circuit for the switching converter in FIG. 1.

In particular, the receiving section 5b is connected to a pin ZCD which is the output terminal of a voltage divider comprising resistors R1, R2 arranged in parallel to the auxiliary winding 10 and is the input terminal of the zero-cross detector (FIG. 2). Thus, the voltage Vzcd detected by the receiving section 5b is proportional to the feedback voltage Vaux.

The wake up management circuit 5, and particularly the receiving section 5b, comprises a setting circuit configured to set a first peak value step1 of the current of the primary winding 8 after the reception of the wake up pulse from the transmitting section 5a, that is when the wake up management circuit 5 is enabled.

The receiving section 5b is configured to receive cycle by cycle sampled voltage values Vk of the signal Vaux representative of the demagnetization of the transformer 7. The sampled voltage values Vk are provided by the sample and hold block 54 which cycle by cycle samples the feedback voltage Vaux across the auxiliary winding 10 at the final time instant of each demagnetization period of the transformer 7 for obtaining the sampled feedback voltage value Vk for each switching cycle. More particularly, the voltage which is sampled is a voltage Vzcd, proportional to the voltage Vaux, at the output terminal of a voltage divider comprising resistors R1, R2 arranged in parallel to the auxiliary winding 10; the output terminal is also the input terminal of the zero-cross detector (FIG. 1).

The receiving section 5b also comprises a comparison section 22 configured to compare cycle by cycle the sampled feedback voltage value Vk with a first voltage threshold Vref1 and provide, as a response, a signal VK_OK_BUS. Preferably, the comparison section 22 compares the sampled feedback voltage value Vk with a plurality of voltage references comprising the first voltage threshold Vref1, a voltage threshold second Vref2 and a third voltage threshold Vref.

The first voltage threshold Vref1 defines a lower voltage limit in which the supply voltage VDD is close to the UVLO (Undervoltage-lockout), wherein the UVLO is the voltage threshold below which the switching converter 1 is turned-off. A condition in which the sampled feedback voltage value Vk is comprised between the voltage corresponding to the UVLO and the first voltage threshold Vref1 is undesired because in this case the feedback voltage Vaux depends on both the output signal Vout and the supply voltage VDD.

The second voltage threshold Vref2 instead is comprised between the first voltage threshold Vref1 and the third voltage reference Vref. For example, the second voltage threshold Vref2 is equal to Vref-d %, where d % is a certain voltage percentage.

Furthermore, the receiving section 5b of the wake up management circuit 5 comprises a core section 23 which receives the signal VK_OK_BUS from the comparison section 22 and is configured to compare the sampled voltage value Vk with the preceding sampled voltage value Vkprec. Preferably the core section, in the case wherein the sampled voltage value Vk is higher than or equal to the preceding sampled voltage value Vkprec, is configured to estimate, for a time window of a number m of subsequent demagnetization periods (with m>1), the trend or waveform of the sampled voltage values Vk.

The receiving section 5b in response to the comparison between the sampled voltage value Vk with at least one voltage threshold Vref1, Vref2, Vref and/or the sampled voltage value Vk with the preceding sampled voltage value Vkprec is configured to maintain the first peak value step1 of the current of the primary winding or set a new peak value step2 . . . stepN of the current of the primary winding of the transformer.

In particular, the core section 23 comprises a finite state machine 24 configured to receive the signal VK_OK_BUS and, as a response, provide an enable signal En_derivation to a signal estimator 26 which is configured to compare the sampled voltage value Vk with the preceding sampled voltage value Vkprec. Preferably the signal estimator 26, in the case wherein the sampled voltage value Vk is higher than or equal to the preceding sampled voltage value Vkprec, is configured to estimate, for a time window of a number m of subsequent demagnetization periods (with m>1), the trend or waveform of the sampled voltage values Vk.

As a function of the comparison and/or the estimation of the trend, the signal estimator 26 provides a control signal Increase_peak_curr to a digital to analog converter (DAC) 20.

For example, if during the number m of subsequent demagnetization periods the sampled feedback voltage value Vk increases, the control signal Increase_peak_curr is set at low logic level. Differently, in the case wherein in a switching cycle the sampled voltage value Vk is lower than the preceding sampled voltage value Vkprec, the control signal Increase_peak_curr is set at high logic level.

The core section 23 finally comprises a counter 27 configured to count a number m of events of a digital signal X and provide to the finite state machine 24 a stop signal TIMEOUT when the count finishes. The signal X is provided by the sample and hold block 54 and represents the demagnetization time of the transformer 7 and in particular it is set high when the transformer 7 is demagnetizing, else it is set low. In this respect, the finite state machine 24 is also configured to set by means of a set signal Set_Counter the number m of events to count, which are the demagnetization periods of the transformer 7 of a succession of m demagnetization periods.

Particularly, the wake up control CONTROL@wkup is a digital signal provided by a block 55 which receives in input the detected voltage Vzcd and a reset signal RS from the finite state machine 24; the wake up control CONTROL@wkup is set high when a "wake up" occurs, else it is set low. Said wake up control CONTROL@wkup is at the input to the finite state machine 24, the digital to analog converter DAC 20, the comparison section 22 and the signal estimator 26 to indicate that a wake up occurs.

In operation, when a wake up signal from the transmitting section 5a is detected, the wake up control CONTROL@wkup deriving from the block 55 is at high logic value, the finite state machine 24 goes from an initial IDLE state to a START_CONTROL state (FIG. 3), the further switch SW2 is closed and the DAC 20 sets a minimum peak value step1 of the current I1 on the primary winding 8. Said minimum peak value step1 of the current I1 is equal to a value vcvref_controlled_min/Rsense, where vcvref_controlled_min is a default minimum value of a voltage signal vcvref_controlled which is the signal provided by the DAC 20 to the PWM 50.

Cycle by cycle, the sample and hold block 54 samples the voltage Vzcd at the final time instant of each demagnetization period of the transformer 7 for obtaining the sampled feedback voltage value Vk. At the same time the digital signal X is provided to the counter 27.

Figure 3:
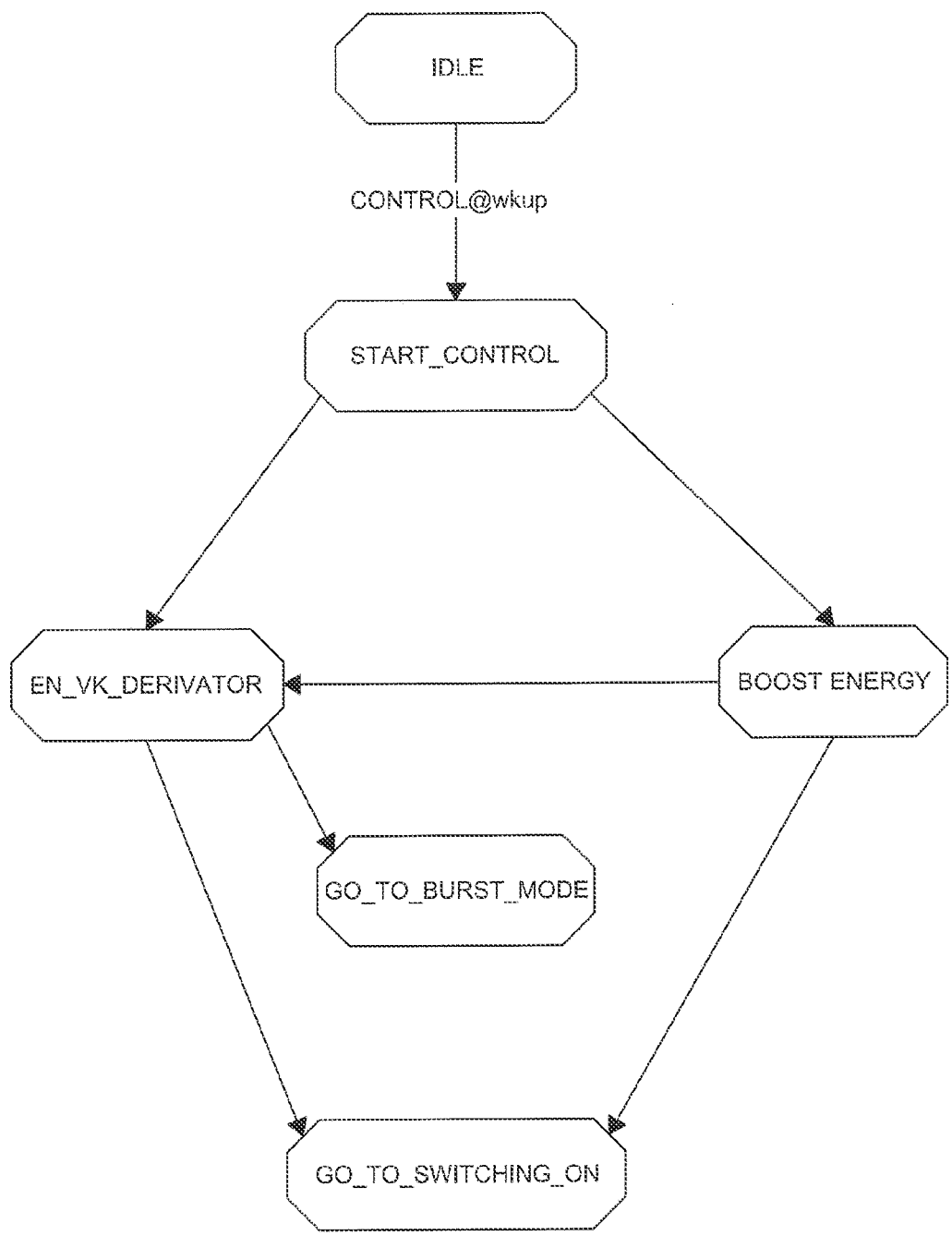
FIG. 3 is a flowchart of the operations effectuated by the wake up management circuit in FIG. 1.
Figure 4:
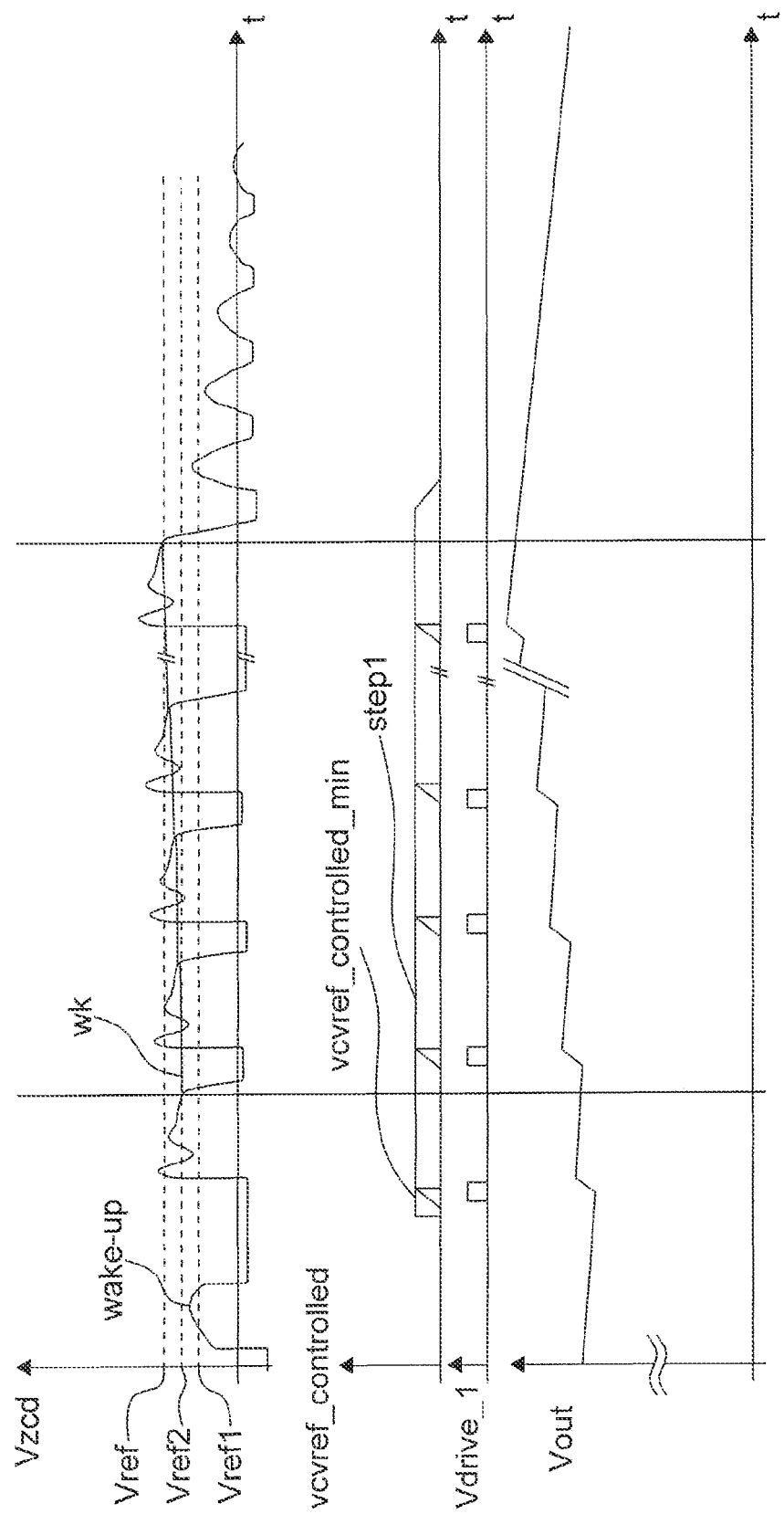
FIGS. 4-6 are timing diagrams showing the signals in play in the switching converter in FIG. 1.
Figure 5:
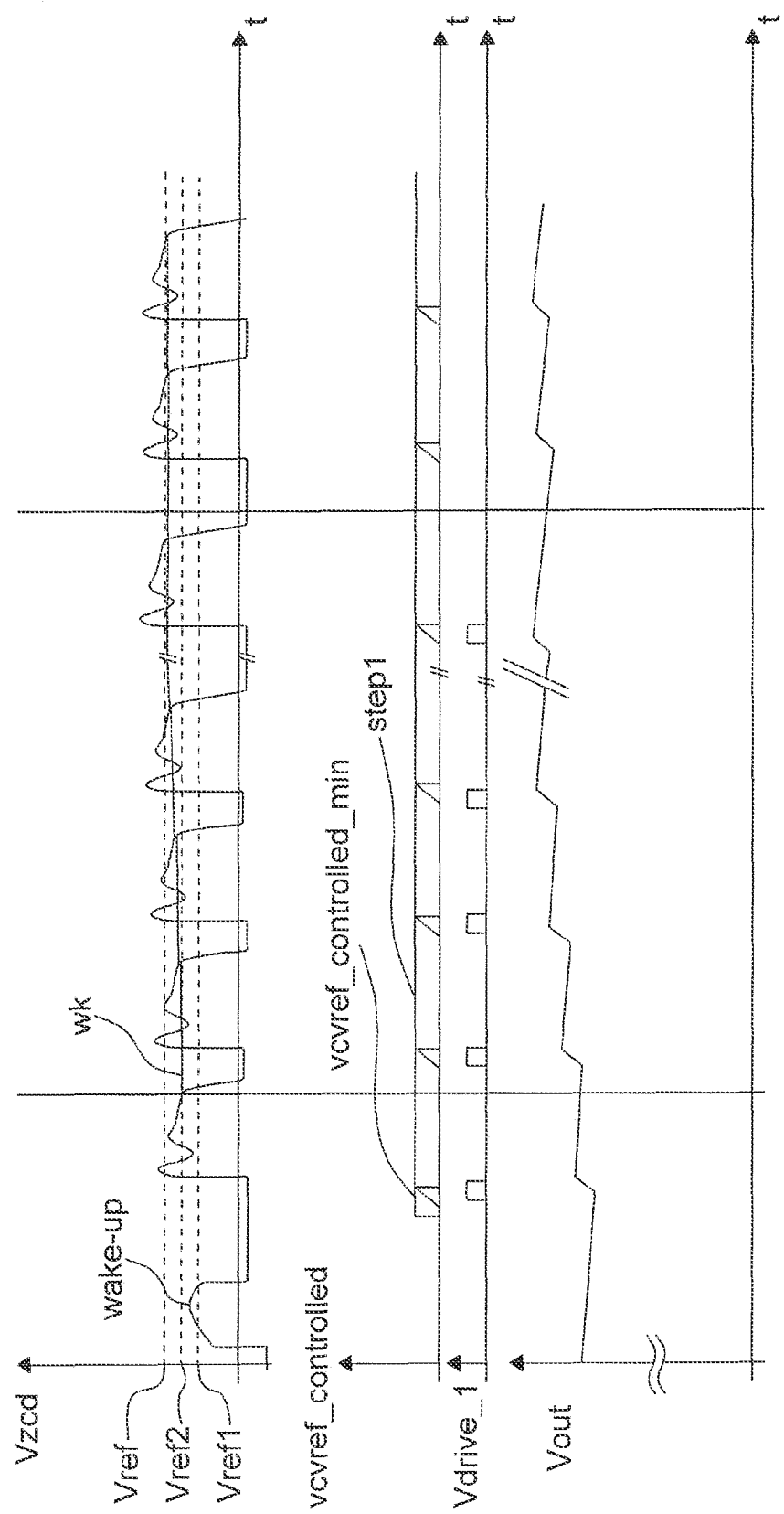
Figure 6:
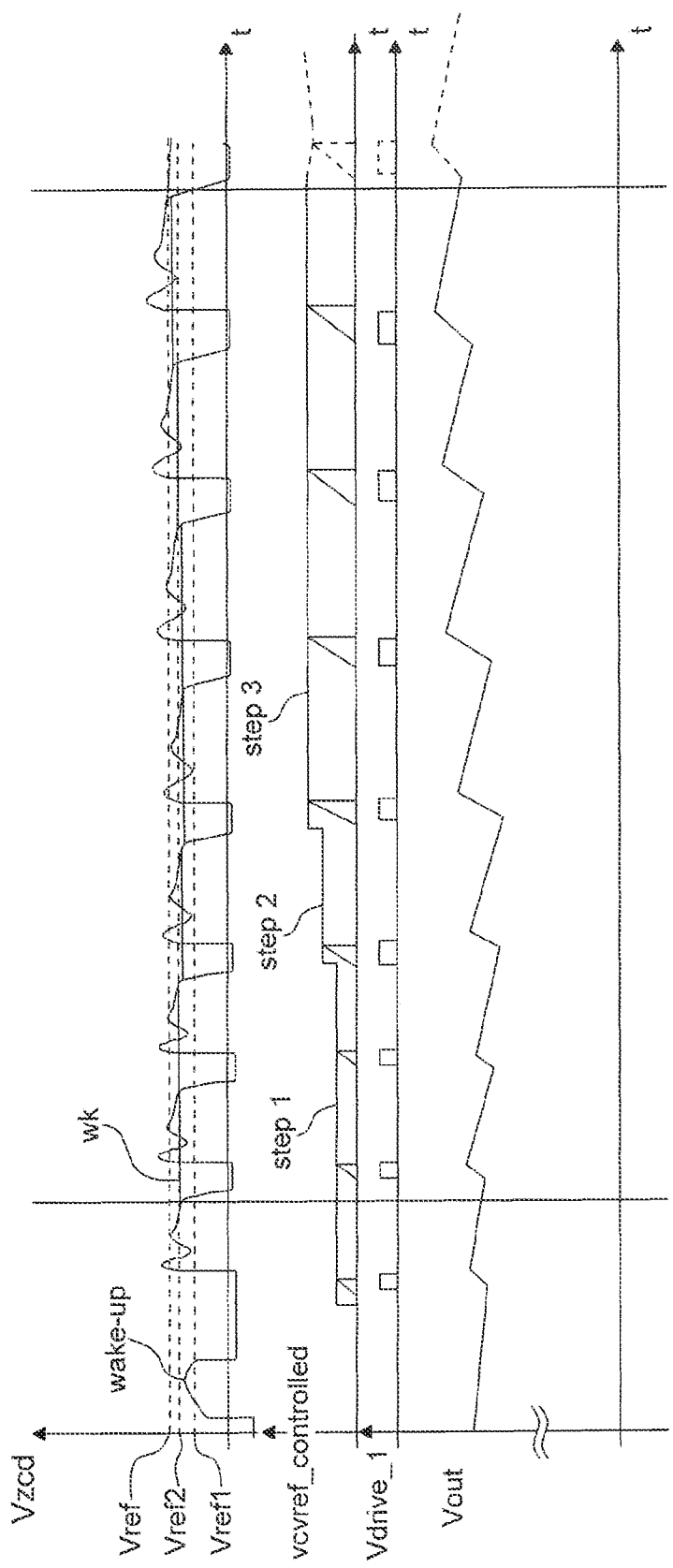

As is shown in FIGS. 4-6, after the wake up the comparator 22 performs a first comparison of the sampled feedback voltage value Vk with the first Vref1, the second Vref2 and third voltage thresholds Vref. If the first sampled feedback voltage value Vk is greater than the first voltage threshold Vref1 the finite state machine 24 goes to a EN_VK_DERIVATOR state (FIG. 3) and turns on the counter 27 to count until the number m of subsequent demagnetization periods of the transformer 7, where m is for example comprised between the 30 and 40. This operation is performed by the finite state machine 24 through the set signal Set_Counter.

At the same time, the finite state machine 24 sends the enable signal En_derivation which is suitable to enable the signal evaluator 26 which compares the sampled voltage value Vk with the preceding sampled voltage value Vkprec, and, in the case wherein the sampled voltage value Vk is higher than or equal to the preceding sampled voltage value Vkprec, for a number m of subsequent demagnetization periods (with m>1), is configured to estimate the trend or waveform of the sampled voltage values Vk.

On the basis of the trend the wake up management circuit controls the switching converter 1 to operate in burst mode or to exit to the burst mode and entering in switching on mode, giving the control to the control circuit 4. The last is the case in which the load LOAD is steady and the supply voltage VDD is not excessively lowered. In particular, if during the number m of subsequent demagnetization periods the sampled feedback voltage value Vk increases reaching the third voltage threshold Vref (the current provided to the load LOAD is greater than the one required by the same) (FIG. 4), and the signal Counted_one provided by the DAC to the finite state machine is set low, to indicate no request of increasing the output current for the load LOAD, then the finite state machine 24 goes to the GO_TO_BURST_MODE state and, in this case, the switching converter 1 enters in burst mode, stopping the switching of the switch SW1; the reset signal RS from the finite state machine 24 sets the control signal CONTROL@wkup at low logic value. Then the finite state machine 24 goes back to the IDLE state waiting for a new wake up condition, that is a new wake up of the switching converter (FIG. 3).

Differently, if during the number m of subsequent demagnetization periods the sampled feedback voltage values Vk remain constant without reaching the third voltage threshold Vref (the current provided to the load LOAD is almost equal to the one required by the same) (FIG. 5), the counter 27 sets high the stop signal TIMEOUT when the count finishes. The finite state machine 24 goes to an GO_TO_SWITCHING_ON state and, in this case, the switching converter 1 enters in switching on mode, the reset signal RS from the finite state machine 24 sets the control signal CONTROL@wkup at low logic value and the wake up management circuit 5 is disabled. Then the finite state machine 24 goes to the IDLE state waiting for a new wake up condition, that is a new wake up of the switching converter (FIG. 3).

In both these cases the control signal Increase_peak_curr is set low by the signal evaluator 26 and the voltage signal vcref_controlled provided by the DAC 20 to the PWM 50 remains unvaried as the minimum peak value step1 of the current I1 on the primary winding 8. This control prevents the problem of acoustic noise because the energy of the series (burst) of switching cycles is controlled; this also avoids an uncontrolled ripple.

Otherwise, in the case wherein the sampled voltage value Vk is lower than the preceding sampled voltage value Vkprec (the current provided to the load LOAD is lower than the one required by the same) (FIG. 6), the signal evaluator 26 detects this situation, sets high the control signal Increase_peak_curr. At the same time, the signal Counted_one provided by the DAC 20 to the finite state machine 24 is set high to indicate a request of increasing the output current for the load LOAD.

At this point, cycle by cycle, the DAC 20 increments the voltage signal vcref_controlled, which means to set an higher peak value step2, step3, . . . , stepN of the current I1, until the sampled feedback voltage value Vk changes and becomes higher than the preceding sampled voltage value, that is its trend starts to increase. When the sampled feedback voltage value Vk reaches the third voltage threshold Vref, the finite state machine 24 goes to the GO_TO_SWITCHING_ON state and the control signal CONTROL@wkup is set at low logic value. Then the finite state machine 24 goes to an IDLE state waiting for a new wake up condition, that is a new wake up of the switching converter (FIG. 3).

On the other hand, when after the first comparison the sampled feedback voltage value Vk is lower than the first voltage threshold Vref1 (the supply voltage is closer to the UVLO of the converter 1), the finite state machine 24 moves to a BOOST_ENERGY state (FIG. 3). The counter 27 starts to count until the number m of subsequent demagnetization periods of the transformer 7 and, at the same time, the finite state machine 24 drives the DAC 20 through a setting signal Set_mi_voltage to set a voltage signal greater than the vcref_controlled. In other terms, is set a second peak value step_boost of the current I1 on the primary winding 8, said second peak value step_boost being at least higher than the minimum peak value step1.

If during the number m of subsequent demagnetization periods the sampled feedback voltage value Vk increases reaching the second voltage threshold Vref2, in the place of the first voltage threshold Vref1, the finite state machine 24 moves to the EN_DERIVATOR state and the wake up management circuit 5b operates as previously described. Otherwise, if during the number m of subsequent demagnetization periods the sampled feedback voltage value Vk remains constant without reaching the second voltage threshold Vref2, the counter 27 sets high the stop signal TIMEOUT and the finite state machine 24 goes to an GO_TO_SWITCHING_ON state and the switching converter 1 enters in switching on mode, the control signal CONTROL@wkup is set at low logic value and the further switch SW2 is configured to give again the control to the control circuit 4. Then the finite state machine 24 goes to the IDLE state waiting for a new wake up condition, that is a new wake up of the switching converter (FIG. 3).

What is claimed is:

1. A wake up management circuit for a switching converter being configured to convert an input signal to a regulated output signal using a switch and a transformer with a primary winding coupled with an input terminal and a secondary winding coupled with an output terminal, wherein said wake up management circuit is configured to:
   receive a signal representative of a demagnetization of the transformer;
   force in response to wake up pulses the switching on of the switch of the switching converter to exit a burst mode; and
   generate a sampled voltage value of the signal representative of the demagnetization of the transformer;
   the wake up management circuit comprising:
      a setting circuit configured to set a first peak value of current of the primary winding;
      a first comparison circuit configured to compare the sampled voltage value with at least one voltage threshold and, in response thereto, generate an enable signal; and
      a second comparison circuit, enabled by said enable signal, configured to compare the sampled voltage value with a preceding sampled voltage value and, in response thereto, maintain the first peak value of the current of the primary winding if the second comparison circuit indicates an increasing trend in the sampled voltage value and set a new peak value of the current of the primary winding of the transformer if the second comparison circuit indicates a decreasing trend in the sampled voltage value.

2. The wake up management circuit according to claim 1, wherein the first comparison circuit is configured to compare the sampled voltage value with a first voltage threshold and a second voltage threshold.

3. The wake up management circuit according to claim 2, wherein the wake up management circuit is further configured to maintain the switching converter in burst mode in a case where the sampled voltage value is higher than the first voltage threshold and the sampled voltage value is higher than the preceding sampled voltage value for a certain number of subsequent demagnetization periods until reaching the second voltage threshold.

4. A wake up management circuit for a switching converter being configured to convert an input signal to a regulated output signal using a switch and a transformer with a primary winding coupled with an input terminal and a secondary winding coupled with an output terminal, wherein said wake up management circuit is configured to:
   receive a signal representative of a demagnetization of the transformer;
   force in response to wake up pulses the switching on of the switch of the switching converter to exit a burst mode; and
   generate a sampled voltage value of the signal representative of the demagnetization of the transformer;
   the wake up management circuit comprising:
      a setting circuit configured to set a first peak value of current of the primary winding; and
      a comparison circuit configured to compare the sampled voltage value with a first voltage threshold and a second voltage threshold and compare the sampled voltage value with a preceding sampled voltage value and, as a response, maintain the first peak value of the current of the primary winding or set a new peak value of the current of the primary winding of the transformer;
   wherein the wake up management circuit is further configured to force the switching converter out of burst mode in a case wherein the sampled voltage value is higher than the first voltage threshold and the sampled voltage value is higher than the preceding sampled voltage value for a certain number of subsequent demagnetization periods without reaching the second voltage threshold.

5. The wake up management circuit according to claim 4, wherein the wake up management circuit is further configured to maintain the switching converter in burst mode in the case where the sampled voltage value is higher than the first voltage threshold and the sampled voltage value is higher than the preceding sampled voltage value for a certain number of subsequent demagnetization periods until reaching the second voltage threshold.

6. A wake up management circuit for a switching converter being configured to convert an input signal to a regulated output signal using a switch and a transformer with a primary winding coupled with an input terminal and a secondary winding coupled with an output terminal, wherein said wake up management circuit is configured to:
   receive a signal representative of a demagnetization of the transformer;
   force in response to wake up pulses the switching on of the switch of the switching converter to exit a burst mode; and
   generate a sampled voltage value of the signal representative of the demagnetization of the transformer;
   the wake up management circuit comprising:
      a setting circuit configured to set a first peak value of current of the primary winding; and
      a comparison circuit configured to compare the sampled voltage value with a first voltage threshold and a second voltage threshold and compare the sampled voltage value with a preceding sampled voltage value and, as a response, maintain the first peak value of the current of the primary winding or set a new peak value of the current of the primary winding of the transformer;
   wherein the wake up management circuit, in a case wherein the sampled voltage value is lower than first voltage threshold, is further configured to set the new peak value of the current of the primary winding, which is higher than the first peak value, until the sampled voltage value becomes higher than or equal to a further voltage threshold comprised between the first voltage threshold and the second voltage threshold, and configured to maintain the switching converter in burst mode or force the switching converter out of the burst mode when the sampled voltage value becomes higher than or equal to a further voltage threshold and when the sampled voltage value is higher than the preceding sampled voltage value for a certain number of subsequent demagnetization periods and reaches or not the second voltage threshold.

7. The wake up management circuit according to claim 6, wherein the wake up management circuit is further configured to maintain the switching converter in burst mode in the case where the sampled voltage value is higher than the first voltage threshold and the sampled voltage value is higher than the preceding sampled voltage value for a certain number of subsequent demagnetization periods until reaching the second voltage threshold.

8. A wake up management circuit for a switching converter being configured to convert an input signal to a regulated output signal using a switch and a transformer with a primary winding coupled with an input terminal and a secondary winding coupled with an output terminal, wherein said wake up management circuit is configured to:
receive a signal representative of a demagnetization of the transformer;
force in response to wake up pulses the switching on of the switch of the switching converter to exit a burst mode; and
generate a sampled voltage value of the signal representative of the demagnetization of the transformer;
the wake up management circuit comprising:
a setting circuit configured to set a first peak value of current of the primary winding; and
a comparison circuit configured to compare the sampled voltage value with a first voltage threshold and a second voltage threshold and compare the sampled voltage value with a preceding sampled voltage value and, as a response, maintain the first peak value of the current of the primary winding or set a new peak value of the current of the primary winding of the transformer;
wherein the wake up management circuit, in a case wherein the sampled voltage value is higher than the first voltage threshold and the sampled voltage value is lower than the preceding sampled voltage value, is further configured to set the new peak value of the current of the primary winding which is higher than the first peak value until the sampled voltage value becomes higher than the preceding sampled voltage value, and to force the switching converter out of burst mode when the sampled voltage value is higher than the preceding sampled voltage value.

9. The wake up management circuit according to claim 8, wherein the wake up management circuit is further configured to maintain the switching converter in burst mode in the case where the sampled voltage value is higher than the first voltage threshold and the sampled voltage value is higher than the preceding sampled voltage value for a certain number of subsequent demagnetization periods until reaching the second voltage threshold.

10. A wake up method for a switching converter, said switching converter being configured to convert an input signal to a regulated output signal by a switch and comprising a transformer with a primary winding coupled with an input terminal and a secondary winding coupled with an output terminal, the method comprising:
driving the switch of the switching converter by forcing the switching on of the switch in response to wake up pulses to exit a burst mode, wherein driving comprises:
setting a first peak value of current of the primary winding,
receiving a sampled voltage value of a signal representative of demagnetization of the transformer,
first comparing the sampled voltage value with at least one voltage threshold and generating an enable signal in response thereto;
in response to said enable signal, second comparing the sampled voltage value with a preceding sampled voltage value; and
in response to the second comparing, maintaining the first peak value of the current of the primary winding if the second comparing indicates an increasing trend in the sampled voltage value and setting a new peak value of the current of the primary winding of the transformer if the second comparing indicates a decreasing trend in the sampled voltage value.

11. The wake up method according to claim 10, wherein the first comparing comprises comparing the sampled voltage value with a first voltage threshold and a second voltage threshold.

12. The wake up method according to claim 11, further comprising maintaining the switching converter in burst mode in a case where the sampled voltage value is higher than the first voltage threshold and the sampled voltage value is higher than the preceding sampled voltage value for a certain number of subsequent demagnetization periods until reaching the second voltage threshold.

13. A wake up method for a switching converter, said switching converter being configured to convert an input signal to a regulated output signal by a switch and comprising a transformer with a primary winding coupled with an input terminal and a secondary winding coupled with an output terminal, the method comprising:
driving the switch of the switching converter by forcing the switching on of the switch with wake up pulses when the switching converter operates in a burst mode, wherein driving:
setting a first peak value of current of the primary winding,
receiving a sampled voltage value of a signal representative of the demagnetization of the transformer,
first comparing the sampled voltage value with a first voltage threshold and a second voltage threshold; and
second comparing the sampled voltage value with a preceding sampled voltage value; and
maintaining the first peak value of the current of the primary winding or setting a new peak value of the current of the primary winding of the transformer in response to said first comparing and second comparing; and
forcing the switching converter out of burst mode in a case where the sampled voltage value is higher than the first voltage threshold and the sampled voltage value is higher than the preceding sampled voltage value for a certain number of subsequent demagnetization periods without reaching the second voltage threshold.

14. The wake up method according to claim 13, further comprising maintaining the switching converter in burst mode in the case where the sampled voltage value is higher than the first voltage threshold and the sampled voltage value is higher than the preceding sampled voltage value for a certain number of subsequent demagnetization periods until reaching the second voltage threshold.

15. A wake up method for a switching converter, said switching converter being configured to convert an input signal to a regulated output signal by a switch and comprising a transformer with a primary winding coupled with an input terminal and a secondary winding coupled with an output terminal, the method comprising:
driving the switch of the switching converter by forcing the switching on of the switch with wake up pulses when the switching converter operates in a burst mode, wherein driving:
setting a first peak value of current of the primary winding,
receiving a sampled voltage value of a signal representative of the demagnetization of the transformer, first comparing the sampled voltage value with a first voltage threshold and a second voltage threshold; and second comparing the sampled voltage value with a preceding sampled voltage value; and maintaining the first peak value of the current of the primary winding or setting a new peak value of the current of the primary winding of the transformer in response to said first comparing and second comparing; and in a case where the sampled voltage value is higher than the first voltage threshold and the sampled voltage value is lower than the preceding sampled voltage value, setting a new peak value of the current of the primary winding which is higher than the first peak value until the sampled voltage value becomes higher than the preceding sampled voltage value, and forcing the switching converter out of burst mode when the sampled voltage value is higher than the preceding sampled voltage value.

16. The wake up method according to claim 15, further comprising maintaining the switching converter in burst mode in the case where the sampled voltage value is higher than the first voltage threshold and the sampled voltage value is higher than the preceding sampled voltage value for a certain number of subsequent demagnetization periods until reaching the second voltage threshold.

17. A wake up method for a switching converter, said switching converter being configured to convert an input signal to a regulated output signal by a switch and comprising a transformer with a primary winding coupled with an input terminal and a secondary winding coupled with an output terminal, the method comprising:

driving the switch of the switching converter by forcing the switching on of the switch with wake up pulses when the switching converter operates in a burst mode, wherein driving:

setting a first peak value of current of the primary winding, receiving a sampled voltage value of a signal representative of the demagnetization of the transformer, first comparing the sampled voltage value with a first voltage threshold and a second voltage threshold; and second comparing the sampled voltage value with a preceding sampled voltage value; and maintaining the first peak value of the current of the primary winding or setting a new peak value of the current of the primary winding of the transformer in response to said first comparing and second comparing; and in a case wherein the sampled voltage value is lower than first voltage threshold, setting a new peak value of the current of the primary winding, which is higher than the first peak value, until the sampled voltage value becomes higher than or equal to a further voltage threshold comprised between the first voltage threshold and the second voltage threshold, and, when the sampled voltage value becomes higher than or equal to the further voltage threshold, maintaining the switching converter in burst mode or forcing the switching converter out of the burst mode in the case wherein each sampled voltage value is higher than the preceding sampled voltage value for a certain number of subsequent demagnetization periods and reaches or not the second voltage threshold.

18. The wake up method according to claim 17, further comprising maintaining the switching converter in burst mode in the case where the sampled voltage value is higher than the first voltage threshold and the sampled voltage value is higher than the preceding sampled voltage value for a certain number of subsequent demagnetization periods until reaching the second voltage threshold.

* * * * *